(12) United States Patent
Hartung et al.

(10) Patent No.: US 9,982,559 B2
(45) Date of Patent: May 29, 2018

(54) BLADE OR VANE FOR A TURBOMACHINE AND AXIAL TURBOMACHINE

(71) Applicant: MTU Aero Engines AG, Munich (DE)

(72) Inventors: Andreas Hartung, Munich (DE); Hermann Klingels, Dachau (DE); Patrick Wackers, Munich (DE); Manfred Feldmann, Eichenau (DE); Frank Stiehler, Bad Liebenwerda (DE); Markus Schlemmer, Mainburg/Wambach (DE)

(73) Assignee: MTU AERO ENGINES AG, Munich (DE)

( * ) Notice: Subject to any disclaimer, the term of this patent is extended or adjusted under 35 U.S.C. 154(b) by 203 days.

(21) Appl. No.: 14/943,686

(22) Filed: Nov. 17, 2015

(65) Prior Publication Data
US 2016/0146041 A1 May 26, 2016

(30) Foreign Application Priority Data
Nov. 24, 2014 (EP) ..................................... 14194517

(51) Int. Cl.
F01D 25/06 (2006.01)
F04D 29/66 (2006.01)
(Continued)

(52) U.S. Cl.
CPC ............... F01D 25/06 (2013.01); F01D 5/10 (2013.01); F01D 5/16 (2013.01); F01D 5/26 (2013.01); F01D 9/041 (2013.01); F04D 29/324 (2013.01); F04D 29/662 (2013.01); F04D 29/668 (2013.01); F01D 9/02 (2013.01); F05D 2220/32 (2013.01); F05D 2220/3212 (2013.01); F05D 2220/3215 (2013.01); F05D 2220/3217 (2013.01); F05D 2220/3219 (2013.01);
(Continued)

(58) Field of Classification Search
CPC ... F01D 25/06; F01D 5/10; F01D 5/16; F01D 5/26; F01D 9/041; F04D 29/324; F04D 29/662; F04D 29/668
See application file for complete search history.

(56) References Cited

U.S. PATENT DOCUMENTS 1,856,786 A * 5/1932 Rice .......................... F01D 5/10
                                                                        416/145
2,349,187 A     5/1944 Meyer
(Continued)

FOREIGN PATENT DOCUMENTS

WO        2012095067 A1    7/2012

Primary Examiner — Igor Kershteyn
Assistant Examiner — Eric Zamora Alvarez
(74) Attorney, Agent, or Firm — Barlow, Josephs & Holmes, Ltd.

(57) ABSTRACT

The present invention relates to a blade or vane for a turbomachine, having at least one impulse element housing with a first impact cavity, in which an impulse element is arranged with play of movement, wherein the impulse element housing has at least one second impact cavity, which is in alignment with the first impact cavity in a first matrix direction and in which an impulse element is arranged with play of movement, and has at least one third impact cavity, which is in alignment with the first impact cavity in a second matrix direction crosswise to the first matrix direction and in which an impulse element is arranged with play of movement.

15 Claims, 2 Drawing Sheets

(51) Int. Cl.
    *F04D 29/32*     (2006.01)
    *F01D 9/04*     (2006.01)
    *F01D 5/10*     (2006.01)
    *F01D 5/16*     (2006.01)
    *F01D 5/26*     (2006.01)
    *F01D 9/02*     (2006.01)

(52) U.S. Cl.
    CPC .... *F05D 2240/129* (2013.01); *F05D 2240/30* (2013.01); *F05D 2250/12* (2013.01); *F05D 2250/121* (2013.01); *F05D 2250/131* (2013.01); *F05D 2250/141* (2013.01); *F05D 2250/313* (2013.01); *F05D 2260/96* (2013.01); *Y02T 50/671* (2013.01)

(56) References Cited

U.S. PATENT DOCUMENTS

| | | | | |
|---|---|---|---|---|
| 2,862,686 | A * | 12/1958 | Bartlett | F01D 5/16 416/213 R |
| 6,478,544 | B2 * | 11/2002 | Brandi | F01D 5/22 416/190 |
| 6,827,551 | B1 * | 12/2004 | Duffy | F01D 5/16 415/119 |
| 6,854,721 | B2 * | 2/2005 | Kato | F16F 7/108 188/380 |
| 2013/0280083 | A1 * | 10/2013 | Hartung | F01D 5/16 416/223 R |

* cited by examiner

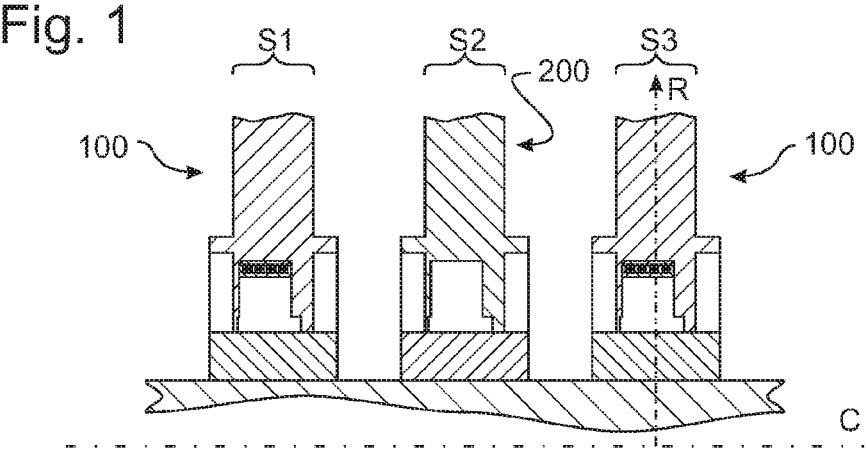
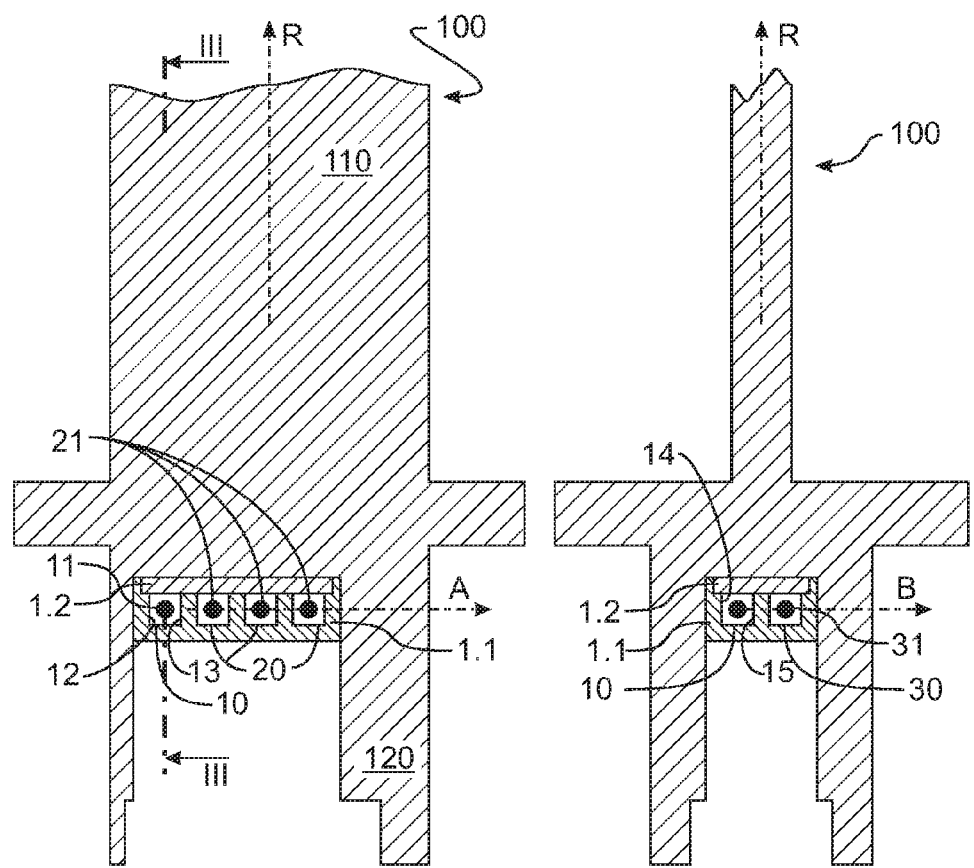

BLADE OR VANE FOR A TURBOMACHINE AND AXIAL TURBOMACHINE

BACKGROUND OF THE INVENTION

The present invention relates to a blade or vane for a turbomachine as well as for an axial turbomachine.

Known from WO 2012/095067 A1 is a turbomachine blade with tuning or impulse elements, which do not substantially reduce the resonances of the blade dissipatively by friction, but rather reduce them by detuning the resonant frequencies by means of impulse-like impact contacts.

SUMMARY OF THE INVENTION

An object of an embodiment of the present invention is to improve a turbomachine, in particular an axial turbomachine.

This object is achieved by a blade or vane for a turbomachine and/or for an axial turbomachine of the present invention. Advantageous embodiments of the invention are discussed in detail below.

According to one embodiment of the present invention, a blade or vane for a turbomachine, in particular at least one blade or vane of a turbomachine, has one or a plurality of impulse element housings, each of which has a first impact cavity, in each of which at least one and, in particular, exactly one impulse element is arranged with play of movement.

In one embodiment, the blade or vane is a rotating blade or a guide vane that is fixed in place on the rotor or housing, respectively. In one embodiment, the turbomachine is a compressor or a turbine of a gas turbine, in particular an aircraft gas turbine.

According to a first aspect, one or a plurality of impulse element housings has one or a plurality of and, in particular at least three second impact cavities, which are in alignment with the first impact cavity in a first matrix direction and in each of which at least one and, in particular exactly one impulse element, is arranged with play of movement. In addition, one or a plurality of these impulse element housings each has one or a plurality of third impact cavities, which are in alignment with the first impact cavity in a second matrix direction, which is crosswise to the first matrix direction and in each of which at least one and, in particular exactly one, impulse element is arranged with play of movement. In one embodiment, the first and second matrix directions enclose between them an angle of at least 30° and at most 150°, in particular an angle between 85° and 95°.

In an enhancement, one or a plurality of these impulse element housings each has one or a plurality of fourth impact cavities, which are spaced apart from the first impact cavity in the first and second matrix directions, are in alignment with a second impact cavity in the second matrix direction and/or with a third impact cavity in the first matrix direction, in particular, and/or are arranged in a plane with the first impact cavity and a second impact cavity and a third impact cavity, in each of which at least one and, in particular exactly one, impulse element is arranged with play of movement.

In one embodiment, the first impact cavity, one or a plurality of and, in particular all, of the second impact cavities, one or a plurality of and, in particular all, of the third impact cavities, and, if need be, one or a plurality of and, in particular all, of the fourth impact cavities are arranged in a common plane. In particular, the first impact cavity and at least one second and at least one third and at least one fourth impact cavity can be distributed in a matrix-like manner, in particular in an equidistant or chessboard-like manner.

In one embodiment, at least one third impact cavity and the first impact cavity and/or at least one second impact cavity and/or at least one fourth impact cavity are designed to be identical in construction and, in particular, have the same dimensions and/or are manufactured from the same material. Additionally or alternatively, at least one third impact cavity and the first impact cavity and/or at least one second impact cavity and/or at least one fourth impact cavity are different in construction and, in particular, have different dimensions and/or are manufactured from different material. Additionally or alternatively, at least one impulse element arranged in a third impact cavity and the impact element arranged in the first impact cavity and/or at least one impulse element arranged in a second impact cavity and/or at least one impulse element arranged in a fourth impact cavity are designed to be identical in construction and, in particular, have the same dimensions and/or are manufactured from the same material. Additionally or alternatively, at least one impulse element arranged in a third impact cavity and the impulse element arranged in the first impact cavity and/or at least one impulse element arranged in a second impact cavity and/or at least one impulse element arranged in a fourth impact cavity are different in construction and, in particular, have different dimensions and/or are manufactured from different material.

Surprisingly, it has been found that such an offset of at least three impact cavities with impulse elements in at least two directions enables resonances of the blade or vane to be reduced in an especially advantageous manner.

According to a second aspect, which can be combined with the first aspect or implemented independently, one or a plurality of impact cavities of one or a plurality of impulse element housings, each of which is in at least a first impact direction and a second impact direction, in which the respective impulse element has play of movement, and which enclose between them an angle of at least 30° and at most 150°, in particular an angle between 85° and 95°, and enclose in each case an angle of at least 75° and at most 105°, in particular an angle between 85° and 95°, with a longitudinal axis of the blade or vane that is perpendicular to the axis of rotation of the turbomachine or to the radial direction of the turbomachine, has cavity walls that lie opposite each other, for which a distance between walls lying opposite each other in the first impact direction and a distance between walls lying opposite each other in the second impact direction differ from each other by at most 10%, in particular by at most 5%, and, in particular, are equal.

For example, if an impact cavity has a square cross section perpendicular to the longitudinal axis, then the distances in the two impact directions parallel to side walls of the square cross section, which each enclose an angle of 90° with each other and with the longitudinal axis, are equal. If, for example, an impact cavity has a circular cross section perpendicular to the longitudinal axis, then the distances in all impact directions that enclose an angle of 90° with the longitudinal axis are equal.

Surprisingly, it has been found that, as a result of such at least substantially equal distances of opposite-lying walls of impact cavities in at least two impact directions in which the respective impulse elements have play of movement, resonances of the blades or vanes can be reduced especially advantageously, provided that these impact directions are at least substantially perpendicular to the longitudinal axis. In one embodiment, the play of movement in at least one impact direction is at least 0.01 mm, in particular at least 0.1 mm, and/or at most 1.5 mm, in particular at most 1.2 mm, still more preferably at most 0.6 mm.

According to a third aspect of the present invention, which can be combined with the first and/or second aspect or can be implemented independently, an axial turbomachine, in particular a compressor or a turbine of a gas turbine, in particular an aircraft gas turbine, has a frontmost stage with a blade or vane cascade assembly in the direction of through flow or a frontmost stage with a guide vane cascade and/or a rotating blade cascade in the direction of through flow; a rearmost blade or vane cascade assembly in the direction of through flow or a rearmost stage with a guide vane cascade and/or a rotating blade cascade in the direction of through flow; and at least one further blade or vane cascade assembly or at least one further stage with a guide vane cascade and/or with a rotating blade cascade assembly, which is arranged between the frontmost and the rearmost blade or vane cascade assembly in the direction of through flow, wherein one or a plurality of rotor blades and/or one or plurality of guide vanes of the frontmost blade or vane cascade assembly and one or a plurality of rotor blades and/or one or a plurality of guide vanes of the rearmost blade or vane cascade assembly, in each case, has or have one or a plurality of impulse element housings with one or a plurality of impact cavities, in each of which at least one and, in particular exactly one, impulse element is arranged with play of movement. According to the third aspect, one or a plurality of the rotor blades, in particular all of them, and/or one or a plurality of the guide vanes, in particular all of them, of the further blade or vane cascade assembly, in particular all of them, have or has, by contrast, no impact cavity in which an impulse element is arranged with play of movement.

Surprisingly, it has been found that, in this way, interferences between impulse elements in the frontmost blade or vane cascade assembly and impulse elements in the rearmost blade or vane cascade assembly can be reduced in an advantageous manner.

As explained above, the first, second, and/or third aspects can be combined with one another or can be implemented independently. The following statements therefore apply in general to one or more of the previously explained aspects or embodiments.

In an enhancement, at least one wall of an impact cavity, in particular one of the previously mentioned walls lying opposite one another, encloses an angle of at most 15°, in particular at most 5°, with the longitudinal axis of the blade or vane. As a result of such an at least substantially radial wall, resonances of the vanes or blades can be reduced in an especially advantageous manner.

In an enhancement, at least one wall of an impact cavity, in particular one of the previously mentioned walls lying opposite one another and/or at least one wall that encloses an angle of at least 75° and/or at most 105° with the longitudinal axis of the blade or vane, is flat or planar. As a result of such a wall, impact contacts can be induced in an especially advantageous manner.

In an enhancement, at least one of the impact cavities has a circular or polygonal and, in particular, a rectangular, pentagonal, or hexagonal, cross section. In one embodiment, such an impact cavity has a polygonal and, in particular, a rectangular, pentagonal, or hexagonal cross section perpendicular to this cross section. An impact cavity can thus be designed, in particular, in a circular cylindrical form, so that it has a circular cross section and, perpendicular thereto, a rectangular cross section.

In an enhancement, one or a plurality of the impulse elements, in particular all of them, in each case has a weight of at least 0.01 g and/or at most 0.075 g. Additionally or alternatively, in one embodiment, a density of one or a plurality of, and in particular all, of the impulse elements is at most 80%, in particular at most 70%, of a density of the body of the blade or vane in which the respective impulse element is arranged. Surprisingly, it has been found that, as a result of this fine-tuning of the densities of impulse elements and the bodies of vanes or blades, their resonances can be reduced in an especially advantageous manner. In this connection, "density" may mean, in particular, the density of a base material of said impulse element or said body of a blade or vane.

In an enhancement, one or a plurality of impulse element housings is manufactured separately and, in particular in multiple parts, and joined detachably to a base element, in particular a blade or vane root, a shroud, or a blade or vane body, of the respective blade or vane, in particular in a form-fitting and/or friction-fitting manner, or else permanently, in particular cohesively. As a result of this, in one embodiment, the manufacture and/or fine-tuning of the impulse element housings can be improved.

In an enhancement, at least one of the impulse element housings is arranged in a half that is closer to the front edge, in particular in a third that is closer to the front edge, of the respective blade or vane, in particular completely inside of a main body of the blade or vane. Additionally or alternatively, in one embodiment, at least one of the impulse element housings is arranged in a half that is closer to the back edge, in particular in a third that is closer to the back edge, of the respective blade or vane, in particular completely inside of a main body of the blade or vane. As a result of this, resonances of the blade or vane can be reduced in an especially advantageous manner.

BRIEF DESCRIPTION OF THE DRAWING FIGURES

Other advantageous enhancements of the present invention ensue from the dependent claims and the following description of preferred embodiments. Shown for this purpose in a partially schematic manner are:

FIG. 1 is a portion of an axial turbomachine according to an embodiment of the present invention in a meridian section;

FIG. 2 is a meridian section through a blade according to an embodiment of the present invention;

FIG. 3 is a section along the line in FIG. 2; and

DETAILED DESCRIPTION OF THE INVENTION

Figure 4:
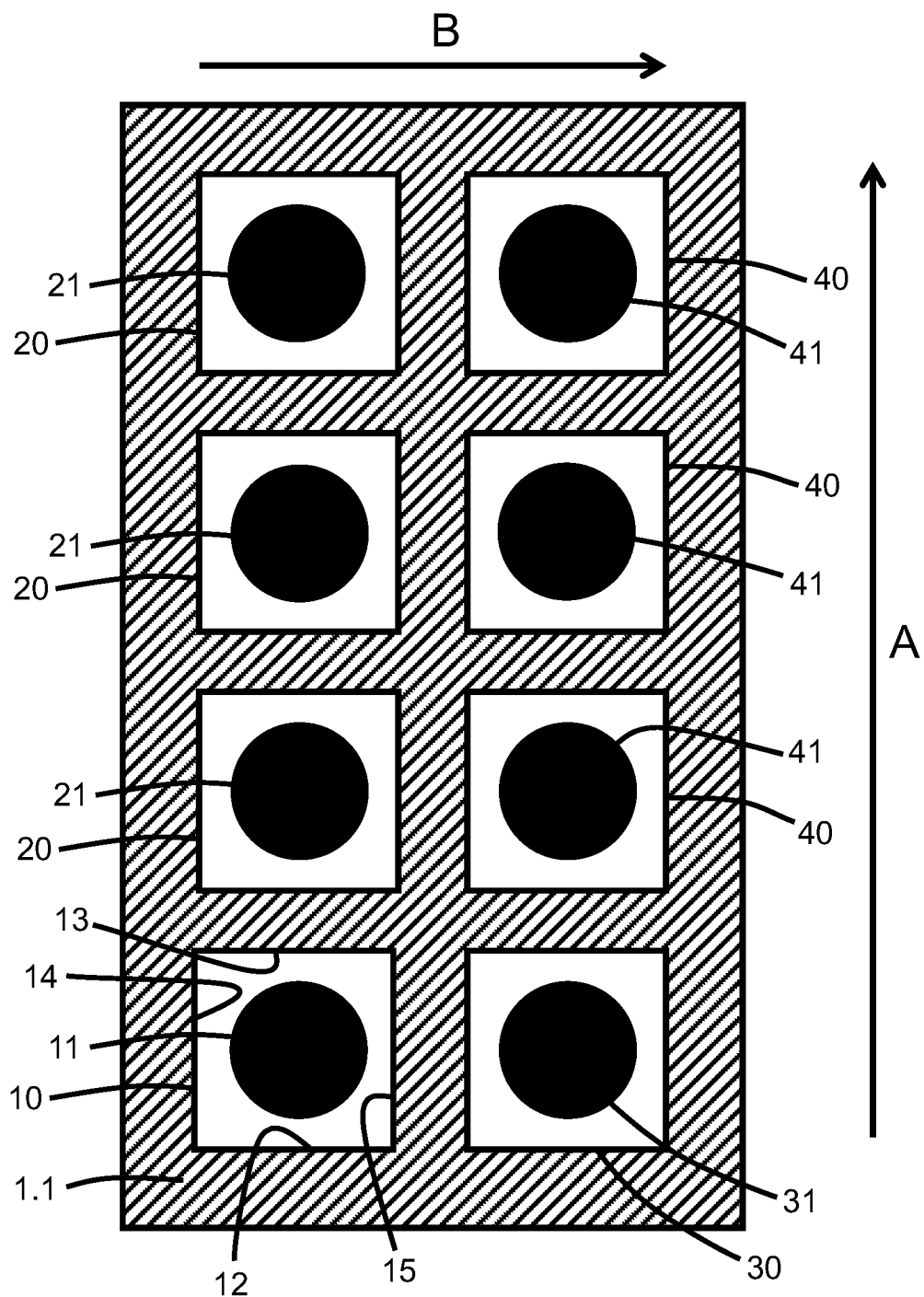
FIG. 4 is a schematic plan view of the impact cavities of the impulse element housing of FIGS. 2 and 3 arranged in a matrix manner with impulse elements therein.

FIG. 2 shows a meridian section through a rotating blade 100 of a compressor of a gas turbine according to an embodiment of the present invention and FIG. 3 shows a section perpendicular to it along the line III-III in FIG. 2. The invention is explained below by way of rotating blades as an example; in a modification, instead of rotating blades, these can be guide vanes.

The blade 100 has a two-part impulse element housing 1.1, 1.2 with a first impact cavity 10, in which an impulse element 11 is arranged with play of movement, which is highlighted in black in the figures for clarity.

The impulse element housing has three second impact cavities 20 (see FIG. 2), which are arranged in alignment with the first impact cavity 10 in a first matrix direction A and in each of which an impulse element 21 is arranged with play of movement. In addition, this impulse element housing has a third impact cavity 30 (see FIG. 3), which is in alignment with the first impact cavity 10 in a second matrix direction B and in which an impulse element 31 is arranged with play of movement. The first and second matrix directions A, B enclose between them an angle between 85° and 95°.

impulse element housing 1.1, 1.2 has three fourth impact cavities 40, although not visible in the sections of FIG. 2, 3, are shown in FIG. 4. In the first matrix direction A, these impact cavities 40 are in alignment with the third impact cavity 30 and, in the second matrix direction B, they are each in alignment with one of the second impact cavities 20, so that they are spaced apart from the first impact cavity 10 both in the first and also in the second matrix directions A, B and are arranged in a common plane. An impulse element 41 with play of movement is also arranged in each of the fourth impact cavities 40.

In the exemplary embodiment, the first impact cavity 10, all three second impact cavities 20, the third impact cavity 30, and all three fourth impact cavities are distributed in an equidistant or chessboard-like manner. In a modification, one or a plurality of these impact cavities can also be arranged with varying distances. Additionally or alternatively, fourth impact cavities, in particular instead of one or two of the second impact cavities 20, can also be arranged in the first and/or second matrix direction(s) out of alignment with the first and/or other impact cavities.

In the exemplary embodiment, all impact cavities are designed to be identical in construction. In a modification, one or a plurality of the impact cavities can also be different in construction. In the exemplary embodiment, all impulse elements arranged in the impact cavities are designed to be identical in construction. In a modification, one or a plurality of the impulse elements arranged in the impact cavities can be different in construction.

The impact cavities of the impulse element housing 1.1, 1.2 each have walls lying opposite each other in a first impact direction A and a second impact direction B, in which the respective impulse elements have play of movement and which enclose an angle between 85° and 95° between them as well as with a longitudinal axis of the blade that is perpendicular to the axis of rotation C of the turbomachine (see FIG. 1) or the radial direction R, of which the walls lying opposite each other 12, 13 of the first impact cavities 10 in the first impact direction A are identified with reference numbers in FIG. 2 and the walls lying opposite each other 14, 15 in the second impact direction B are identified with reference numbers in FIG. 3. A distance between the walls lying opposite each other in the first impact direction and a distance between the walls lying opposite each other in the second impact direction differ by at most 5% in the first, one or a plurality of the second, the third, and/or one or a plurality of the fourth impact cavities.

FIG. 1 shows a portion of the compressor of the gas turbine according to an aspect of the present invention in a meridian section with two rotating blades 100, as discussed above with reference to FIGS. 2, 3.

The compressor has a frontmost (left in FIG. 1) blade cascade assembly in the direction of through flow (from left to right in FIG. 1) or a frontmost stage S1 in the direction of through flow, having a rotating blade cascade with rotating blades 100 distributed in the circumferential direction, a rearmost (right in FIG. 1) blade cascade assembly in the direction of through flow or a rearmost stage S3 in the direction of through flow, having a rotating blade cascade with rotating blades 100 distributed in the circumferential direction, and a further blade cascade assembly or stage S2 having a rotating blade cascade with rotating blades 200 distributed in the circumferential direction, which is arranged between the frontmost and the rearmost blade cascade assembly in the direction of through flow.

As explained above with reference to FIGS. 2, 3, at least some of the rotating blades 100 of the frontmost blade cascade assembly S1 and at least some of the rotating blades 100 of the rearmost blade cascade assembly S3 each have an impulse element housing 1.1, 1.2 with a plurality of impact cavities, in each of which an impulse element is arranged with play of movement (see the enlarged illustration in FIGS. 2, 3).

By contrast, one or a plurality and, in particular, all of the rotating blades 200 of the further blade cascade assembly S2 do not have an impact cavity in which an impulse element is arranged with play of movement.

As explained above, the first and/or second aspect(s) of the present invention discussed with reference to FIGS. 2, 3 and the third aspect of the present invention discussed in regard to FIG. 1 can be combined with one another or implemented independently. The following statements therefore refer generally to one or more of the previously discussed aspects or embodiments.

As can be seen, in particular by way of the example of the first impact cavity 10 in FIGS. 2, 3, the walls of the impact cavities (12, 13, 14, and 15 for the first impact cavity 10) enclose an angle of at most 5° with the longitudinal axis of the blade or the radial direction R.

As can be seen, in particular, by way of the example of the first, second, and third impact cavities 10, 20, and 30, respectively, in FIGS. 2, 3, a radial inner (bottom in FIGS. 2, 3) and a radial outer (top in FIGS. 2, 3) wall of the impact cavities, which enclose an angle of at least 75° and at most 105° with the longitudinal axis R, are flat or planar.

In one embodiment, at least one of the impact cavities has a circular or polygonal, in particular rectangular, pentagonal, or hexagonal cross section, perpendicular to the longitudinal axis R, which appears identically in the two sections of FIGS. 2, 3.

The impulse elements (11, 21, 31 for the first, second, and third impact cavity (cavities)), which are arranged in the impact cavities, each have a weight of at least 0.01 g and at most 0.075 g. In addition, a density of the impulse elements is at most 70% of a density of the body 110 of the blade (see FIG. 2).

The multipart impulse element housings 1.1, 1.2 are manufactured separately and joined detachably or permanently to a blade root 120 of the respective blade. In a modification that is not illustrated, it is possible, additionally or alternatively, for the impulse element housings also to be arranged in the blade body 110 and/or in a shroud.

In one embodiment, at least one of the impulse element housings is arranged in a half (left in FIGS. 1, 2) closer to the front edge and/or at least one of the impulse element housings is arranged in a half (right in FIGS. 1, 2) closer to the back edge of the respective blade. The impulse element housings 1.1, 1.2 are illustrated enlarged in FIGS. 1-3 and therefore seem to project from the half closer to the front edge into the half closer to the back edge, even though, in a dimensionally more accurate illustration, they are arranged completely in the half that is closer to the front edge.

Although exemplary embodiments were discussed in the preceding description, it is noted that a large number of modifications are possible.

Moreover, it is noted that the exemplary embodiments are merely examples, which in no way shall limit the protective scope, the applications, and the construction. Instead, the preceding description gives the person skilled in the art a guideline for the implementation of at least one exemplary embodiment, it being possible to make diverse modifications, in particular in regard to the function and arrangement of the described components, without departing from the protective scope, as ensues from the claims and combinations of features equivalent to them.

What is claimed is:

1. A blade or vane for a turbomachine, comprising:
   at least one impulse element housing including
      a first impact cavity, in which an impulse element is arranged with play of movement,
      at least one second impact cavity, which is in alignment with the first impact cavity in a first matrix direction and in which an impulse element is arranged with play of movement,
      at least one third impact cavity, which is in alignment with the first impact cavity in a second matrix direction crosswise to the first matrix direction and in which an impulse element is arranged with play of movement, and
      at least one fourth impact cavity, which is in alignment with the at least one third impact cavity in a first matrix direction and in which an impulse element is arranged with play of movement and is, respectively, in alignment with the respective at least one second impact cavity in the second matrix direction, and
   at least one of the impact cavities in at least one first and one second matrix direction, which enclose between them an angle of at least 30° and at most 150° and each of which encloses an angle of at least 75° and at most 105° with a longitudinal axis of the blade or vane that is perpendicular to an axis of rotation of the turbomachine, in each case, has cavity walls lying opposite each other, wherein a distance between the cavity walls lying opposite each other in the first matrix direction differs by at most 10% in comparison to a distance between the cavity walls lying opposite each other in the second matrix direction;
   whereby the first impact cavity, the at least one second impact cavity, the at least one third cavity and the at least one fourth cavity are arranged in a substantially equidistant matrix-like manner.

2. The blade or vane according to claim 1, wherein at least one wall of at least one of the impact cavities encloses an angle of at most 15° with the longitudinal axis of the blade or vane.

3. The blade or vane according to claim 1, wherein at least one wall of at least one of the impact cavities is flat.

4. The blade or vane according to claim 1, wherein at least one of the impact cavities has a circular or polygonal cross section.

5. The blade or vane according to claim 1, wherein a weight of at least one of the impulse elements is at least 0.01 g and/or at most 0.075 g.

6. The blade or vane according to claim 1, wherein a density of at least one of the impulse elements is at most 80% of a density of a body of the blade.

7. The blade or vane according to claim 1, wherein the impulse element housing is manufactured separately in multiple parts, and joined detachably or permanently to a main body root, a shroud, or a body of the blade.

8. The blade or vane according to claim 1, wherein at least one of the impulse element housings is arranged in a half of the blade closer to a front edge and/or at least one of the impulse element housings is arranged in a half of the blade closer to a back edge.

9. An axial turbomachine, comprising:
   a frontmost blade cascade assembly in a through flow direction,
   a rearmost blade cascade assembly in the through flow direction, and
   at least one further blade cascade assembly, which is arranged between the frontmost and the rearmost blade cascade assemblies in the through flow direction,
   wherein at least one rotating blade of the frontmost blade cascade assembly and at least one rotating blade of the rearmost blade assembly has at least one impulse element housing with at least one impact cavity, in which an impulse element is arranged with play of movement, and
   wherein at least one guide vane and/or one rotating blade of the further blade cascade assembly does not have an impact cavity, in which an impulse element is arranged with play of movement.

10. The axial turbomachine according to claim 9, wherein at least one wall of at least one of the impact cavities encloses an angle of at most 15° with a longitudinal axis of the blade perpendicular to an axis of rotation of the axial turbomachine, and/or is flat.

11. The axial turbomachine according to claim 9, wherein at least one of the impact cavities has a circular or polygonal cross section.

12. The axial turbomachine according to claim 9, wherein a weight of at least one impulse element is at least 0.01 g and/or at most 0.075 g.

13. The axial turbomachine according to claim 9, wherein a density of at least one of the impulse elements is at most 80% of a density of a body of the blade in which the impulse element is arranged.

14. The axial turbomachine according to claim 9, wherein the impulse element housing is manufactured separately in multiple parts, and joined detachably or permanently to a main body root, a shroud, or a body of the blade, in which the impulse element is arranged.

15. The axial turbomachine according to claim 9, wherein at least one of the impulse element housings is arranged in a half of the blade closer to a front edge and/or at least one of the impulse element housings is arranged in a half of the blade closer to a back edge, in which blade the impulse element housing is arranged.

* * * * *